United States Patent

Kuwayama et al.

[11] Patent Number: 5,277,268
[45] Date of Patent: Jan. 11, 1994

[54] THREE-WHEEL BATTERY FORK-LIFT TRUCK

[75] Inventors: Junichi Kuwayama; Hisao Nagata; Masanao Kobayakawa, all of Kariya, Japan

[73] Assignee: Kabushiki Kaisha Toyoda Jidoshokki Seisakusho, Kariya, Japan

[21] Appl. No.: 947,498

[22] Filed: Sep. 18, 1992

[30] Foreign Application Priority Data

Sep. 19, 1991 [JP] Japan .................................. 3-268827
Jan. 10, 1992 [JP] Japan .................................. 4-22125

[51] Int. Cl.⁵ .......................... B62D 61/08; B62D 5/22
[52] U.S. Cl. ..................................... 180/216; 180/147; 180/161
[58] Field of Search ..................... 280/98, 92; 180/215, 180/216, 210, 65.1, 147, 159, 161

[56] References Cited

U.S. PATENT DOCUMENTS

| | | | |
|---|---|---|---|
| 2,362,129 | 11/1944 | Gfrorer | 180/65.1 |
| 2,387,077 | 10/1945 | Johnson | 280/92 |
| 2,492,649 | 12/1949 | MacDuff | 280/92 |
| 2,828,721 | 4/1958 | Folkerts | 180/147 |
| 3,033,051 | 5/1962 | Reinke et al. | 180/147 |
| 3,556,241 | 1/1971 | Mitchell | 180/79.2 |
| 3,709,099 | 1/1973 | Dumeah | 180/147 |
| 4,754,837 | 7/1988 | McCormick | 180/253 |
| 4,986,387 | 1/1991 | Thompson et al. | 180/212 |

FOREIGN PATENT DOCUMENTS

| | | |
|---|---|---|
| 1920711 | 11/1969 | Fed. Rep. of Germany . |
| 3545046 | 7/1986 | Fed. Rep. of Germany . |
| 4106739 | 9/1991 | Fed. Rep. of Germany . |
| 1549941 | 12/1968 | France . |
| 2241026 | 3/1975 | France . |
| 2290342 | 6/1976 | France . |
| 2370878 | 6/1978 | France . |
| 853045 | 11/1960 | United Kingdom . |
| 938945 | 10/1963 | United Kingdom . |
| 1055206 | 1/1967 | United Kingdom . |
| 1272653 | 5/1972 | United Kingdom ................ 180/147 |
| 1354636 | 5/1974 | United Kingdom . |

OTHER PUBLICATIONS

European Search Report of Jan. 11, 1993.

Primary Examiner—Karin L. Tyson
Attorney, Agent, or Firm—Brooks Haidt Haffner & Delahunty

[57] ABSTRACT

A three-wheel fork-lift truck having one rear steering wheel to be turned by a compact steering assembly of simple construction providing sufficient space for accommodating various kinds of attachments. The steering assembly is composed of a pinion provided with the rear steering wheel, a rack engaged with the pinion, and a hydraulic cylinder as an actuator for moving the rack in the axial direction. By moving the rack in lateral direction either to the right or left, the pinion is rotated to turn the rear steering wheel via a steering shaft.

10 Claims, 12 Drawing Sheets

(PRIOR ART)

FIG.15

(PRIOR ART)

THREE-WHEEL BATTERY FORK-LIFT TRUCK

BACKGROUND OF THE INVENTION

The present invention relates to a three-wheel battery fork-lift truck, more particularly to its steering gear mechanism.

DESCRIPTION OF THE RELATED ARTS

Figure 16:
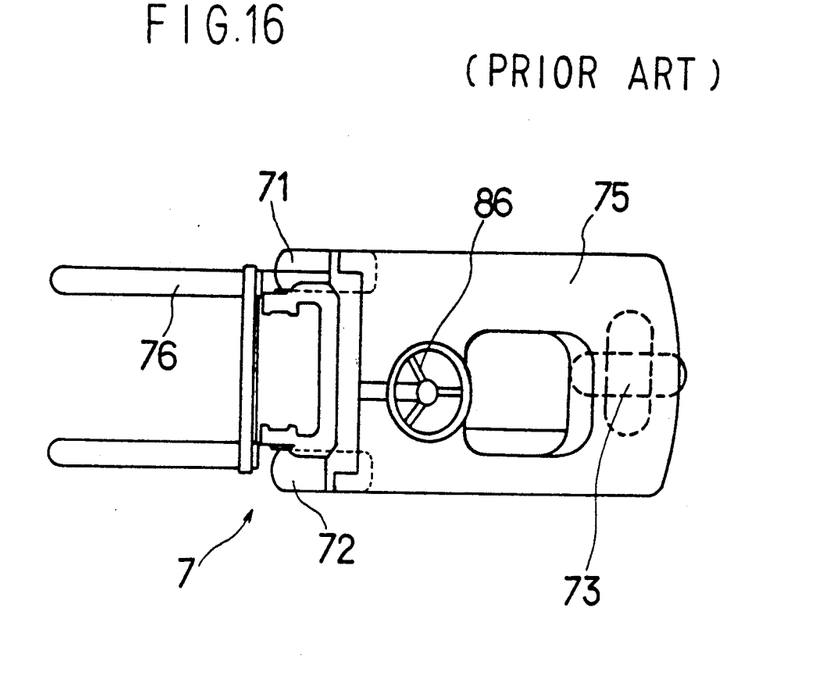
FIG. 16 is a plan view of the three-wheel battery fork-lift truck of the prior art.
Figure 17:
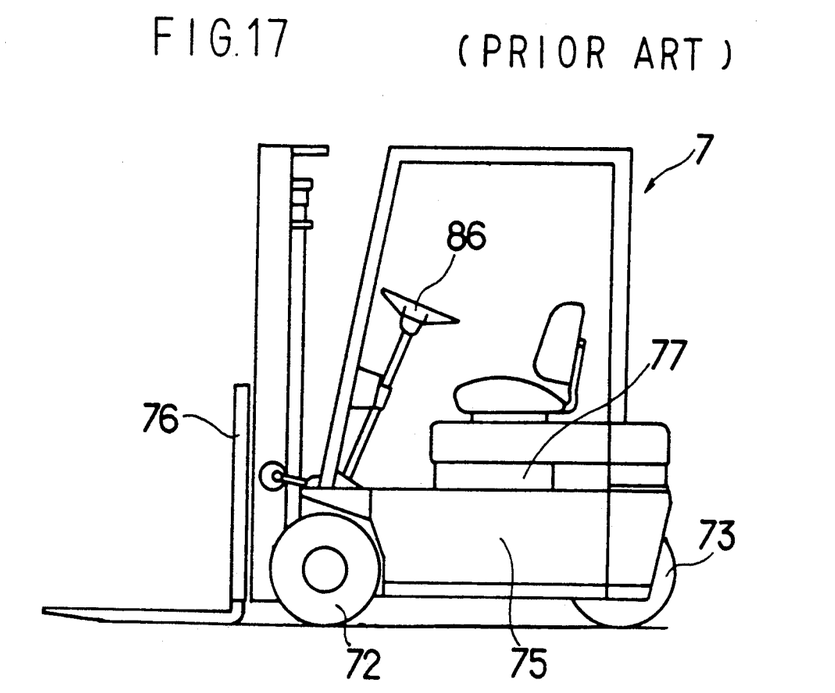
FIG. 17 is a side elevational view of the three-wheel battery fork-lift truck of the prior art.

As FIGS. 16 and 17 show, a three-wheel battery fork-lift truck 7 has two front wheels 71 and 72, and one rear steering wheel 73. The rear steering wheel 73 is operated in a lateral direction by turning a steering wheel 86 to move the truck in the desired direction. Reference numerals 76 and 77 designate a fork and battery case, respectively.

The steering mechanism linking the steering wheel 86 and the rear steering wheel 73 will be described referring to FIGS. 13, 14, and 15.

Figure 13:
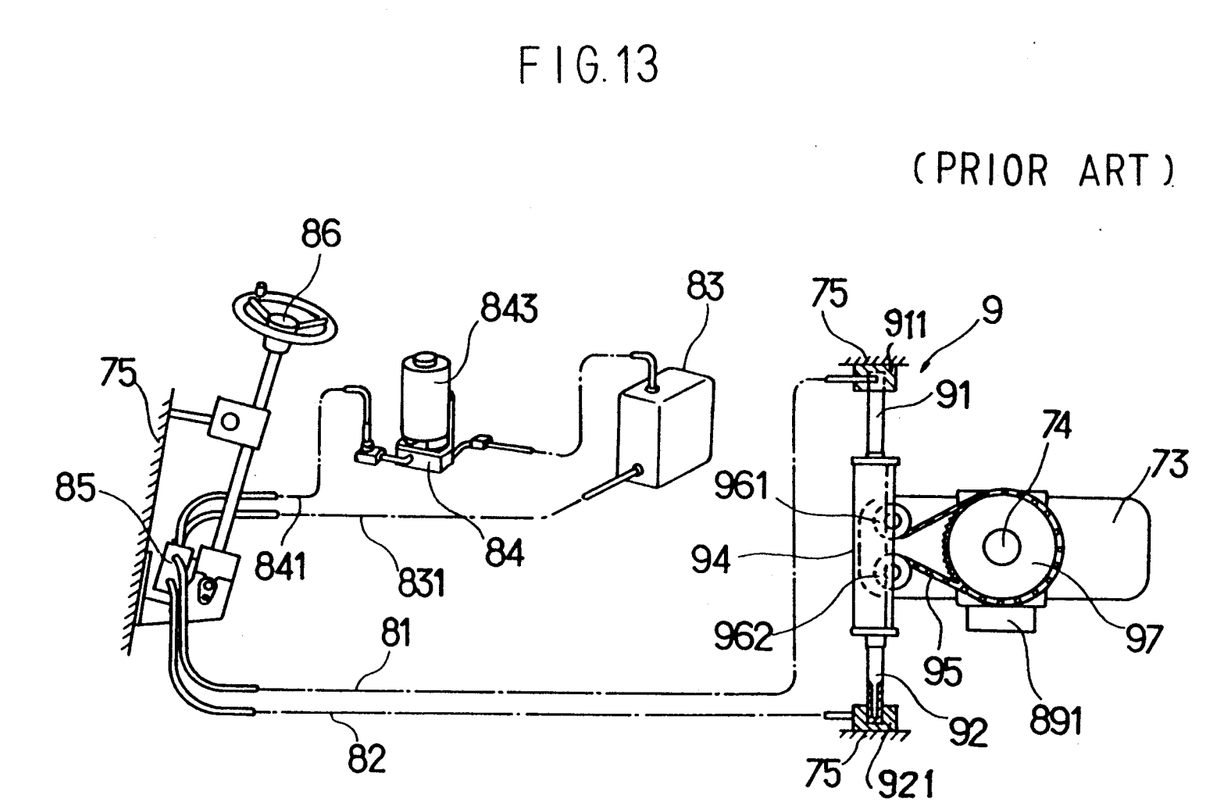
FIG. 13 is a schematic view of the steering assembly of the prior art.

As FIG. 13 shows, a cylinder tube 94 is connected with a sprocket wheel 97 mounted on the upper part of the rear steering wheel 73 via a chain 95. The cylinder tube 94 is connected with a steering control valve 85 via hydraulic hoses 81 and 82. Turning the steering wheel 86 will move the cylinder tube 94 in lateral direction through hydraulic pressure to control the steering to the rear steering wheel 73 via the chain 95 and the sprocket wheel 97.

Figure 14:
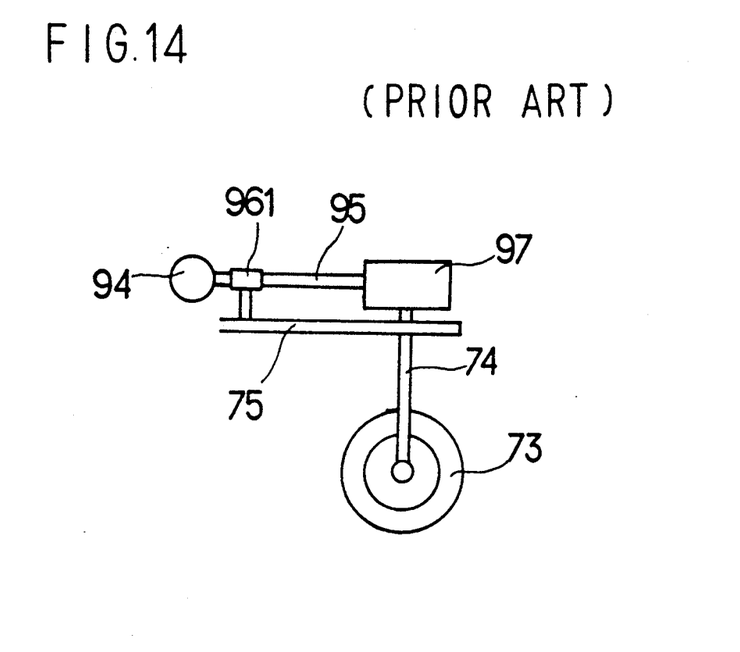
FIG. 14 is a side elevational view of the steering assembly of the prior art.
Figure 15:
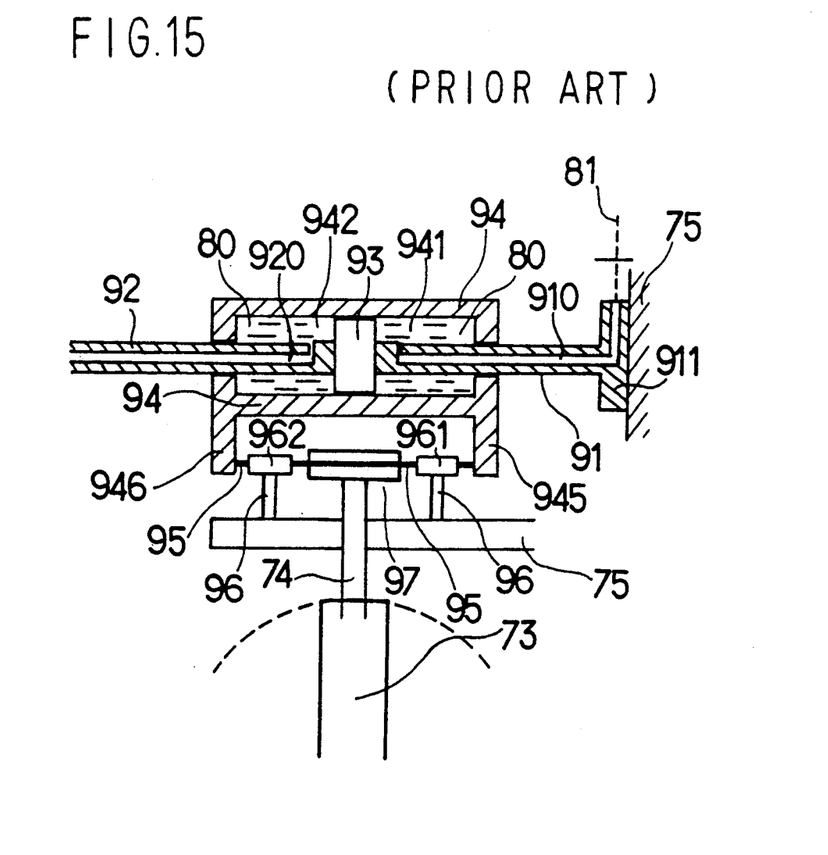
FIG. 15 is a rear view of the steering assembly of the prior art, partially in section.

More in detail, as FIGS. 14 and 15 show, the sprocket wheel 97 is mounted on the upper part of the rear steering wheel 73 via a steering shaft 74. The cylinder tube 94 has a piston 93 therein and piston rods 91 and 92 connected to both sides thereof. Base ends 911 and 921 of the piston rods 91 and 92 are fixed to a body frame 75, respectively (FIGS. 13 and 15).

The piston rods 91 and 92 have oil passages 910 and 920 which open into the right hydraulic chamber 941 and the left hydraulic chamber 942 of the cylinder tube 94, respectively. The oil passages 910 and 920 are connected to the oil hoses 81 and 82, respectively (FIG. 13).

As FIG. 15 shows, brackets 945 and 946 are provided with the lower part of the cylinder tube 94. Idle sprocket wheels 961 and 962 are mounted on the body frame 75 through shaft pins 96. The chain 95 is provided between the sprocket wheel 97 and left and right brackets 945 and 946 of the cylinder tube 94 via the idle sprocket wheel 961 and 962.

As FIG. 13 shows, the hydraulic hoses 81 and 82 are connected with an oil tank 83 and a power steering pump 84 via the steering control valve 85.

The rear steering wheel 73 is operated by turning the steering wheel 86 in desired direction of either right or left. To run the battery fork-lift truck to the right, the steering wheel 86 is rotated in a clockwise direction to apply pressure to the hydraulic hose 81 through the operation of the steering control valve 85. As FIG. 15 shows, work oil 80 is supplied into the right hydraulic chamber 941 of the cylinder tube 94 through the oil passage 910 of the piston rod 91. Accordingly, the pressure in the right hydraulic chamber 941 increases to move the cylinder tube 94 to the right guided along fixed piston rods 91 and 92. The chain 95 is stretched to the right via the idle sprocket wheel 961. Consequently, the sprocket wheel 97 rotates in a counter-clockwise direction to rotate the rear steering wheel 73 connected therewith in a counter-clockwise direction, thus turning the battery fork-lift truck 7 to the right.

The fork-lift truck 7 will be turned to the left by carrying out the reverse of the operation described above.

The aforementioned steering assembly 9 of the three-wheel battery fork-lift truck has several drawbacks, as described below, since it is constructed to move cylinder tube 94 in a lateral direction. In order to operate the steering assembly 9, the battery fork-lift truck needs to have its body frame 75 mounted with various kinds of attachments such as a battery case 77, oil tank 83, power steering pump 84, and the like. Because cylinder tube 94 must be above to move in a lateral direction, the right, left, and upper sides of the cylinder tube 94 scarcely have sufficient space to accommodate such attachments. A recent model of the fork-lift truck requires even more attachments to be mounted thereon. In order to accommodate these additional attachments, the steering assembly should be as compact as possible.

In addition, the conventional steering assembly 9 requires idle sprocket wheels 961 and 962, chain 95, and sprocket wheel 97 in order to convert the linear motion of the cylinder tube 94 into rotary motion of the steering shaft 74, thereby increasing the size of the steering assembly 9. Since the cylinder tube 94 as a drive source and steering shaft 74 are spaced widely apart, the mechanism of the steering assembly becomes further complicated. If slack occurs in the chain 95, the steering operation becomes slow and imprecise.

SUMMARY OF THE INVENTION

It is an object of the present invention to provide a three-wheel battery fork-lift truck having a compact steering assembly of simple construction which allows sufficient space for accommodating various kinds of attachments thereon.

The present invention provides a three-wheel battery fork-lift truck having two front wheels and one rear steering wheel with its steering shaft connected to a steering assembly including a pinion, and an actuator for moving a rack in an axial direction.

Other features and advantages of this invention will be apparent from the following description and the accompanying drawings.

DETAILED DESCRIPTION OF THE PRESENTLY PREFERRED EMBODIMENTS

In a battery fork-lift truck of the present invention, the actuator works to turn the rear steering wheel via a pinion by moving a rack in its axial direction. The actuator may be a hydraulic cylinder, pneumatic cylinder, power-driven stepping motor, or the like. The actuator is so constructed to be operated interlocked with the operation of the steering wheel (See Embodiment 1).

When driving the three-wheel battery fork-lift truck of the present invention, turning the hand steering wheel in the direction desired by the operator will drive the actuator interlocked therewith. Then the rack moves in its corresponding axial direction, thus rotating the pinion engaged therewith. Consequently, the steering shaft coupled with the pinion rotates to turn the rear steerable steering wheel. Finally, the battery fork-lift truck runs in the desired direction either to the right or left.

In the steering assembly of the present invention, a rack movable in a lateral direction is engaged with a pinion joined to the steering shaft in the vicinity thereof. By this construction, the size of the entire steering assembly is reduced, compared with the conventional steering assembly, thereby enlarging the space available to accommodate the necessary attachments.

In the conventional steering assembly, the cylinder tube is connected to the steering shaft through the idle sprocket wheel, chain, and sprocket wheel in order to convert the linear motion of the cylinder tube into rotary motion of the steering shaft. The steering assembly of the present invention has a simple structure where the pinion is engaged with the rack. Thus, the present invention provides a three-wheel battery fork-lift truck having a compact steering assembly of simple construction which allows sufficient space to accommodate various attachments.

The steering assembly of the present invention may be so constructed to have a pinion provided with a steering shaft of the rear steering wheel, a rack mounted on the body frame to be engaged with the pinion, and a hydraulic cylinder to move the rack in the axial direction. the rack has a piston on its end which is inserted into the hydraulic cylinder. A plurality of resin bushes are provided between the inner periphery of the hydraulic cylinder and the rack. Those resin bushes may be placed between the point of engagement of the rack and the pinion, and the piston so as to protect the slide contact portion of the hydraulic cylinder and the piston from being worn, and to provide excellent durability.

The most important characteristic of the above invention is that the rear steering wheel is turned in the desired direction by means of the rack which is driven by the hydraulic cylinder via the piston, and the resin bushes are provided between the inner periphery of the hydraulic cylinder and the rack.

The resin bushes are ring-shaped with their inner surfaces slidably contacted with the outer periphery of the rack. The outer periphery of the resin bushes are preferably fixed to the inner periphery of the hydraulic cylinder, for example, by fitting the outer peripheries of the resin bushes into a concavity part formed in the inner periphery of the hydraulic cylinder.

Figure 6:
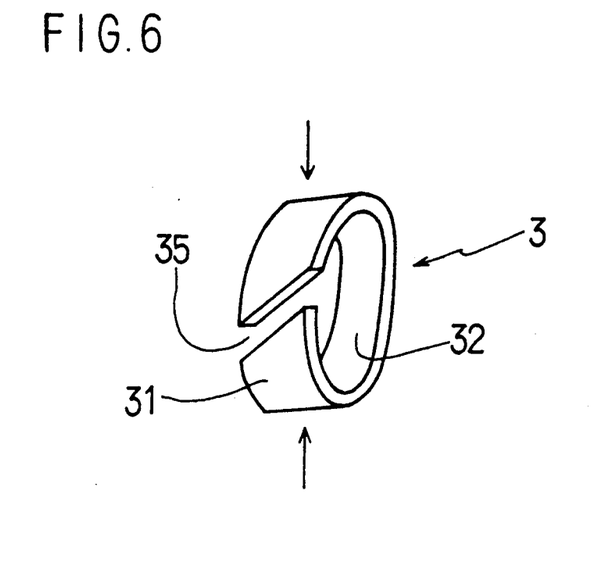
FIG. 6 is a perspective view of a resin bush of Embodiment 2.

As FIG. 6 shows, each resin bush is preferably provided with a slit formed along the axial direction so as to make installation easier. Since the outside diameter can be made smaller during insertion and fixation, the inner periphery of the hydraulic cylinder is kept from being damaged. Preferably the resin bushes have a width ranging from 5 to 20 mm slidably in contact with the outer periphery of the rack. The resin bushes may be formed from synthetic resin having excellent wear resistance such as polyamide, polyacetal, or silicone resins.

The resin bushes are placed between the piston and the point of engagement of the pinion and the rack. It is preferable to place the resin bushes as close as possible to the point of engagement, so as to bear effectively the reaction force from the pinion. In the present Embodiment 2, the hydraulic cylinder, interlocked with the hand steering wheel, works to turn the rear steering wheel via the pinion by moving the rack in the axial direction.

Generally the rack is pushed by the hydraulic cylinder to turn the rear steering wheel. At this time, the rack is subjected to a substantial pressure force in the opposite direction of the pinion movement upon receiving the reaction force thereof. As a result, substantial friction is generated between the piston and the hydraulic cylinder to cause wear therebetween, resulting in leakage of the work oil from the hydraulic cylinder.

The above-described reaction force is generated at every turning of the rear steering wheel, thus accelerating such leakage of the work oil. In contrast, the steering assembly of the present invention has a plurality resin bushes to receive the pressure force resulting from the reaction force, thus preventing friction between the piston and the hydraulic cylinder and providing excellent durability.

The actuator of the steering assembly of the present invention may be provided with the hydraulic cylinder having a hydraulically workable piston. Such hydraulic cylinder has a cylinder end inserted at its end. The cylinder end has a stop plate fixed to the rear surface thereof. It may be so constructed as to engage a locking projection formed on the stop plate in a notch formed in the end surface of the hydraulic cylinder, and to insert the fitting that supplies the work oil into the cylinder end (Embodiment 3).

As described below, the fittings can be tightly joined to the cylinder end by forming the cylinder end, stop plate, and the notch. By this means, the fitting can be mounted easily and the cost for manufacturing the steering gear is reduced.

Embodiment 1

The three-wheel battery fork-lift truck in accordance with this embodiment of the present invention will be described referring to FIGS. 1, 2 and 3.

A steering assembly of the three-wheel fork-lift truck of this embodiment is composed of a pinion 1 provided with a steering shaft 61 of a rear steering wheel 73, a rack 2 mounted on a bracket 770 of a body frame to be engaged with the pinion 1, and hydraulic cylinders 231 and 232 a an actuator for driving the rack 2 in its axial direction (lateral direction of the body frame). As FIG. 3 shows, the steering shaft 61 rotatably supports the rear steering wheel 73 axially at its lower axle shaft 62. It has a support point shaft 63 on its top where the pinion 1 is fixed coaxially thereto. The support point shaft 63 is axially supported on a support beam 77 mounted on the body frame via a bearing 65.

Figure 1:
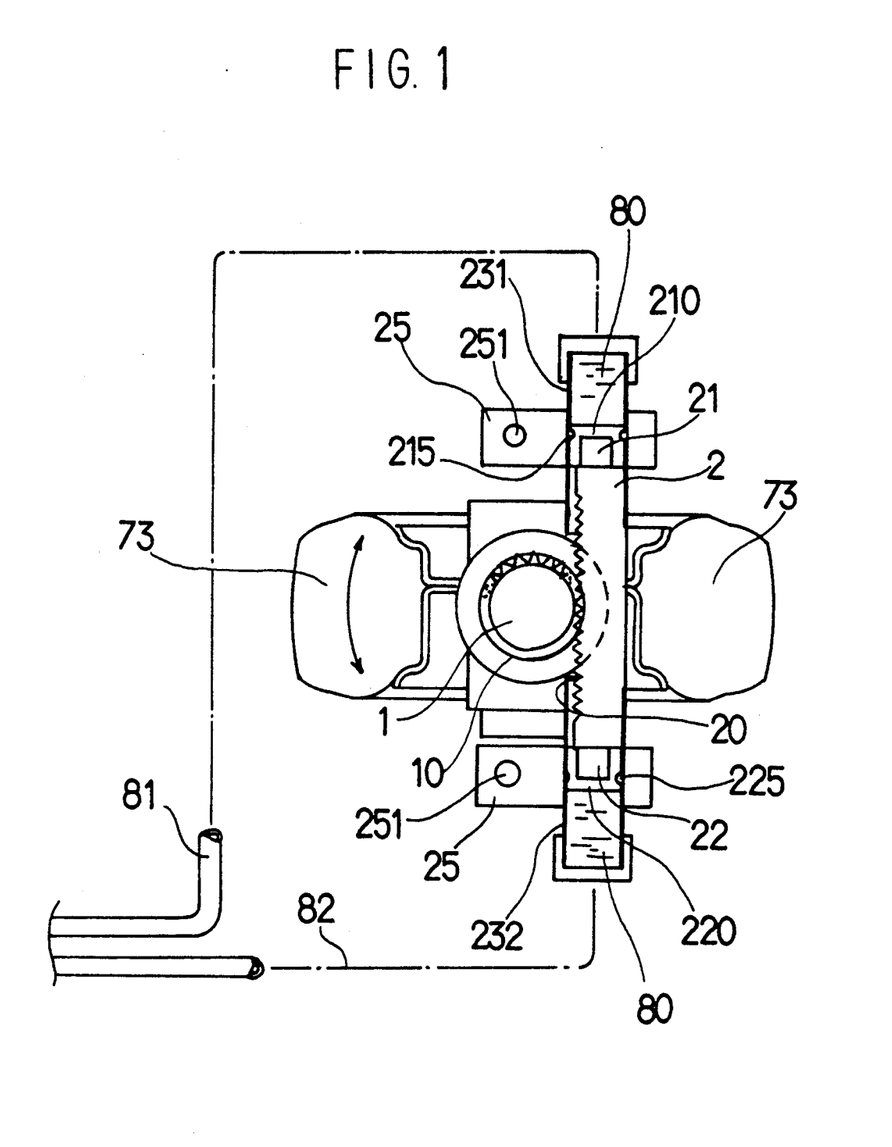
FIG. 1 is a plan view of a steering assembly used in a three-wheel battery fork-lift truck of Embodiment 1.
Figure 2:
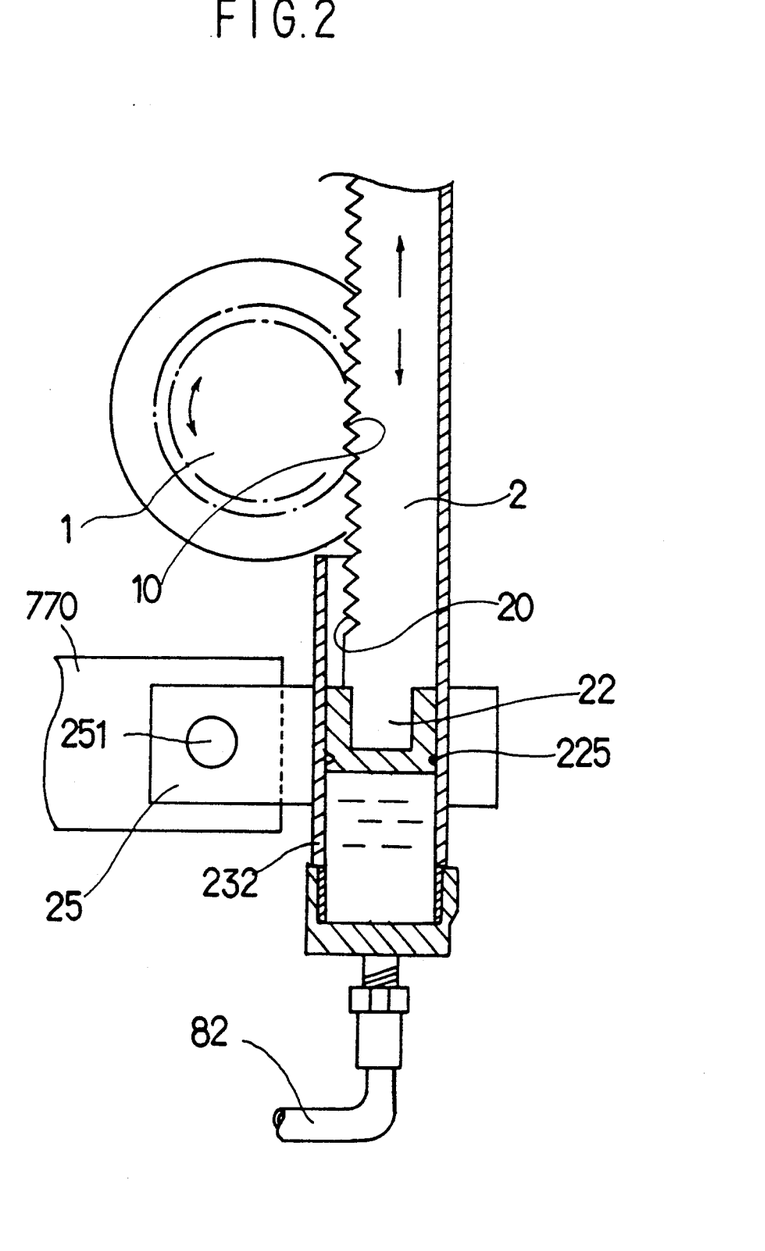
FIG. 2 is a partially enlarged plan view of the steering assembly of Embodiment 1.
Figure 3:
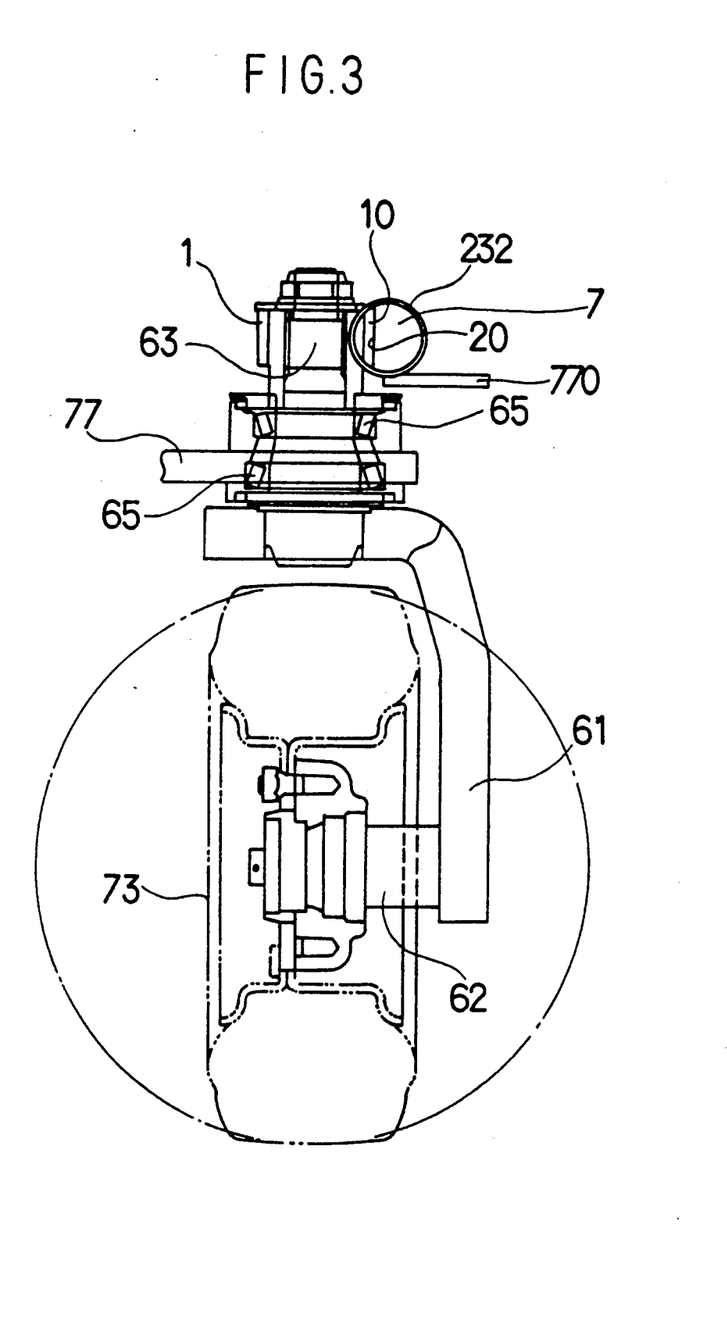
FIG. 3 is a side elevational view of the steering assembly and the rear steering wheel of Embodiment 1.

As FIGS. 1 and 2 show, the rack 2 has a tooth part 20 to be engaged with a tooth part 10 of the pinion 1. Both ends 21 and 22 of the rack 2 are joined with the pistons 210 and 220, respectively, provided within the hydraulic cylinders 231 and 232. Oil seals 215 and 225 are provided between the piston and the hydraulic cylinders, 210 and 231, and 220 and 232, respectively. The hydraulic cylinders 231 and 232 are connected with hydraulic hoses 81 and 82, and secured to frames 25, respectively.

Each frame 25 has a mount hole 251 through which it is respectively fixed to the bracket 770 of the body frame. As FIG. 13 shows, the hydraulic hoses 81 and 82 are connected to the steering control valve 85 interlocked with the steering wheel 86. Other features are the same as those of the prior art.

When driving the three-wheel battery fork-lift truck of this embodiment, the steering wheel 86 is turned in the desired running direction. To drive to the right, the steering wheel 86 is turned in a clockwise direction and the work oil is supplied to the hydraulic hose 82 via the steering control valve 85 in the same way as in the prior art. (FIG. 13) As FIGS. 1 and 2 show, the work oil 80 flows into the left hydraulic cylinder 232 to push the piston 220. Consequently the rack 2 is forced to the right. At this time, the piston 210 at the right side of the rack 2 works to return the work oil 80 within the hydraulic cylinder 231 to the oil tank via the hydraulic hose 81, and steering control valve 85 (FIG. 13). Upon the movement of the rack 2 to the right, the pinion 1, engaged by the rack 2, rotates in a counter-clockwise direction. As FIGS. 1 and 3 show, the steering shaft 61 fixed to the pinion 1 rotates in the same direction, which turns the rear steering wheel 73 in a counter-clockwise direction. Thus, the battery fork-lift truck turns to the right. In the steering assembly of the present invention, the rack 2 movable in a lateral direction is engaged with the pinion 1 that is provided with the steering shaft 61 in the vicinity thereof. By this construction, the size of the steering assembly is reduced compared with the conventional steering assembly thus enlarging the space that may accommodate the attachments.

In the present invention, the rack 2 is only engaged with the pinion 1, resulting in simple structure of the steering assembly. This is unlike the conventional steering assembly, where the cylinder tube is connected with the steering shaft via the idle sprocket wheel, chain, and sprocket wheel to convert the linear motion of the cylinder tube to rotary motion of the steering shaft, thereby resulting in a complicated and bulky mechanism.

In the current embodiment, the hydraulic cylinders 231 and 232 are fixed to the bracket 770 of the body frame via frames 25, respectively. Each of both frames 25 has a mount hole 251 through which a bolt is inserted. As a result, the engagement of the rack 2 mounted on the hydraulic cylinders 231 and 232, and the pinion 1 can be adjusted simply. Then the backlash between the rack 2 and the pinion 1 is adjustable, thus improving the steering response. The hydraulic cylinders 231 and 232 can be removed, allowing the rack 2 to be maintained easily. In the prior art, a piston is inserted into the conventional cylinder tube, both sides of which are provided with piston rods. The section area of the piston against which the hydraulic pressure is exerted does not include the cross section of the piston rod, thus requiring enlargement of the sprocket wheel. The whole cross section of the pistons 210 and 220 inserted into the hydraulic cylinders 231 and 232 receives the hydraulic pressure, thereby obtaining substantially greater thrust with the same cylinder diameter. Therefore, the pinion diameter may be smaller than that of the sprocket wheel used in the prior art.

Embodiment 2

In this embodiment, the steering assembly described in Embodiment 1 has ring-shaped resin bushes 3 between the inner periphery of the hydraulic cylinder and the rack 2, as FIGS. 4 through 7 show. The resin bushes 3 are placed between an engaged part 28 where the pinion engages with the rack 2, and the pistons 210 and 220, respectively.

As FIG. 6 shows, each resin bush 3 is ring-shaped with a narrow slit 35 cut diagonally in the axial direction. The resin bushes 3 are fitted into ring-shaped concavities 239 formed in the inner peripheries of the hydraulic cylinders 231 and 232, respectively. An outer periphery 31 of the resin bush 3 is fitted into the concavity 239 to have an inner periphery 32 thereof slidably engaging with the outer periphery of the rack 2. The resin bush 3 is formed of polyamide resin.

When fitting the resin bush 3 into the concavity 239 of the hydraulic cylinder, it is compressed to make the outer diameter thereof smaller by reducing the width of the slit 35. The compressed resin bush 3 is inserted into the inner peripheries of the hydraulic cylinders 231 and 232 and slipped into the concavities 239. The outer periphery 31 of the resin bush 3 fits into the concavity 239. Other features are the same as those of Embodiment 1.

In this Embodiment, the steering assembly has the resin bushes 3 between the hydraulic cylinders 232 and 231, respectively. The resin bushes 3 are placed between the point of engagement 28 and the piston 220 and 210, respectively, thus preventing friction between the hydraulic cylinder 232 and the piston 220, and providing excellent durability.

Figure 7:
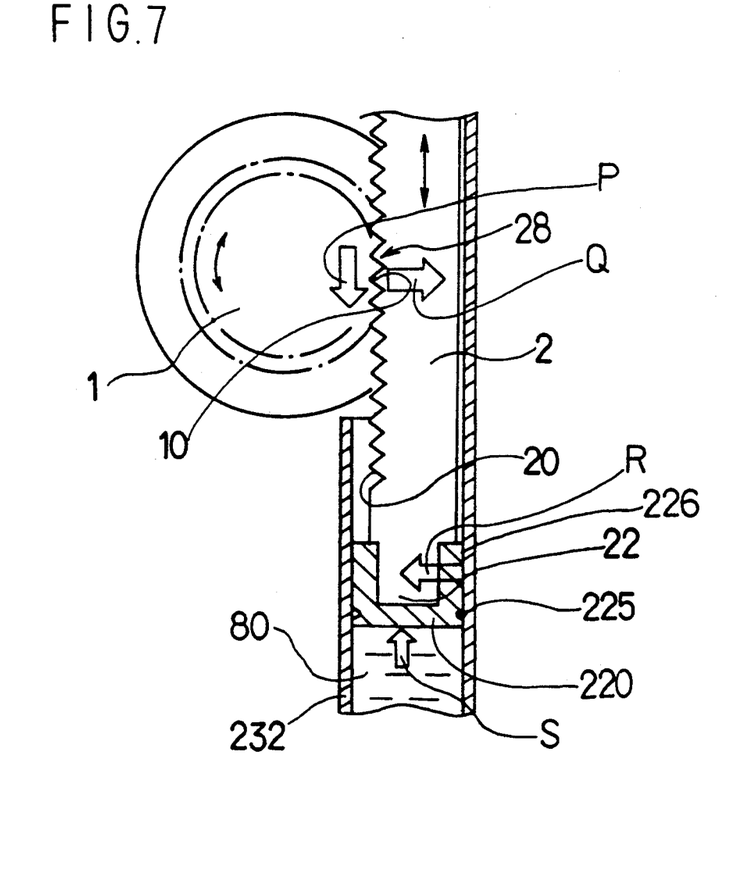
FIG. 7 is an explanatory view of reaction forces generated in Embodiment 2.

When turning the rear steering wheel 73, the piston 220 is pushed by the work oil 80 of the hydraulic cylinder, as arrow mark S of FIG. 7 shows, to rotate the steering shaft 61 via the rack 2 and the pinion 1. At this time, the rack 2 presses the pinion 1 at the point of engagement 28 in the turning direction. It experiences a reaction force from the pinion 1. Therefore, the rack 2 receives a substantially great pressure force Q directed away from the pinion 1.

The pressure force Q is transmitted to the piston 220 mounted at the end of the rack 2 causing it to exert the pressure force R on the inner periphery of the hydraulic cylinder 232, which generates strong friction between the piston 220 and the hydraulic cylinder 232. As a result, the friction wear is generated therebetween, causing the work oil 80 within the hydraulic cylinder 232 to leak.

In the present embodiment, the resin bush 3 is placed as aforementioned to receive the pressure forces Q and R resulting from the reaction force P. Frictional wear, thus, is not produced between the piston 220 and the hydraulic cylinder 232, thereby preventing the work oil 80 from leaking for a long-period of service, and providing excellent durability.

When the pressure angle of the teeth of the pinion 1 is 20°, and the thrust of the work oil is 1700 kgf, the pressure force Q will reach 581 kgf which is obtained by the following calculation of 1700 kgf×sin 20°=581 kgf. Such large pressure force Q is generated at every turning of the rear steering wheel.

The present embodiment is so constructed that the resin bushes receive the above pressure force Q to prevent friction from occurring between the hydraulic cylinder and the piston. Thus, the resin bush 3 markedly improves the steering function.

Generally a piston is inserted into the conventional cylinder tube, both sides of which are provided with piston rods. The section area of the piston to which the hydraulic pressure is exerted does not include the cross section of the piston rod, thus requiring enlargement of the sprocket wheel. In the present embodiment, the entire cross section of the pistons 210 and 220 inserted into the hydraulic cylinders 231 and 232 receive the hydraulic pressure, thereby obtaining substantially greater thrust with the same cylinder diameter. Therefore, the pinion diameter may be smaller than that of the previously used sprocket wheel.

Embodiment 3

In this embodiment the improvement is in the structure around the hydraulic cylinder in the steering assembly of Embodiment 1 especially fittings 47 for supplying work oil shown in FIGS. 8 to 12.

Figure 8:
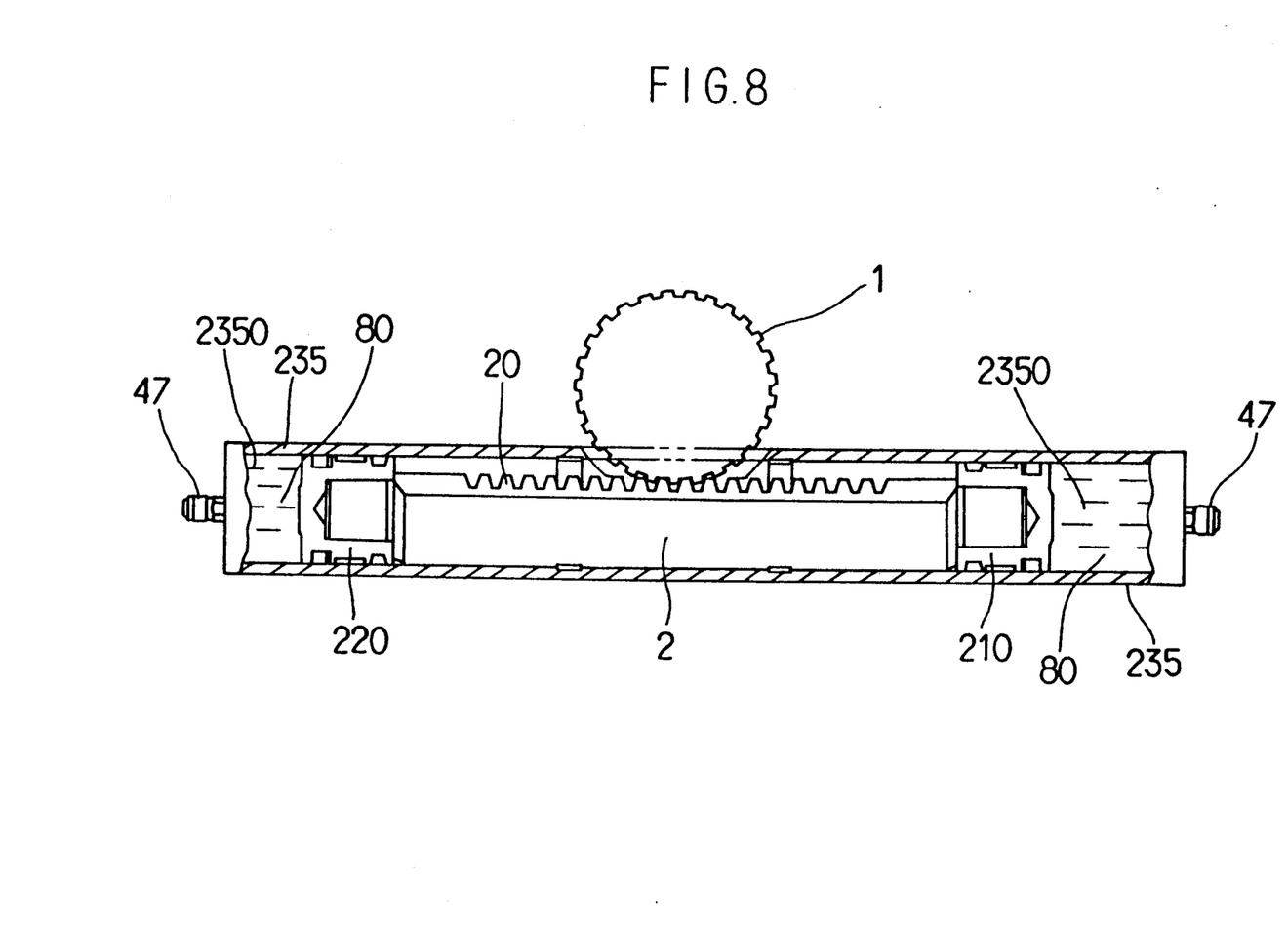
FIG. 8 is a partial longitudinally sectioned top view of a steering mechanism used in a three-wheel battery fork-lift truck of Embodiment 3.
Figure 9:
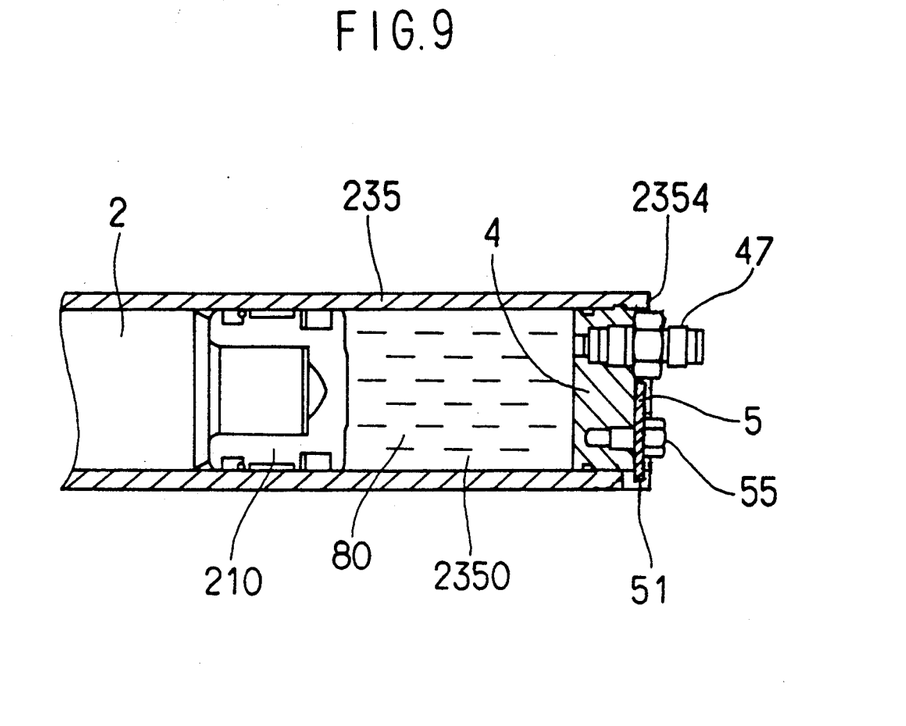
FIG. 9 is a fragmentary enlarged elevational view in longitudinal section of the steering mechanism of Embodiment 3.
Figure 12:
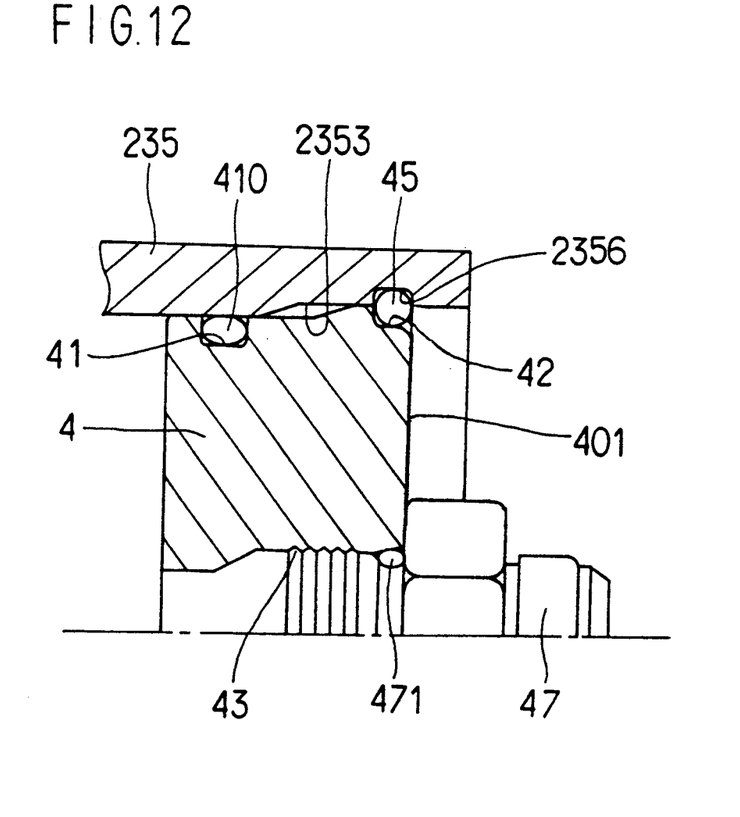
FIG. 12 is an enlarged sectional view of the periphery of an end plate in Embodiment 3.

As FIGS. 8 and 9 show, a rack 2 is inserted into a hydraulic cylinder 235. The rack 2 has pistons 210 and 220 on its both ends. Cylinder ends 4 are inserted into both ends of the hydraulic cylinder as shown in FIGS. 9 and 12. The rear surface 401 (exterior surface) of the cylinder end 4 has a stop plate 5 secured thereto with a bolt 55.

Figure 10:
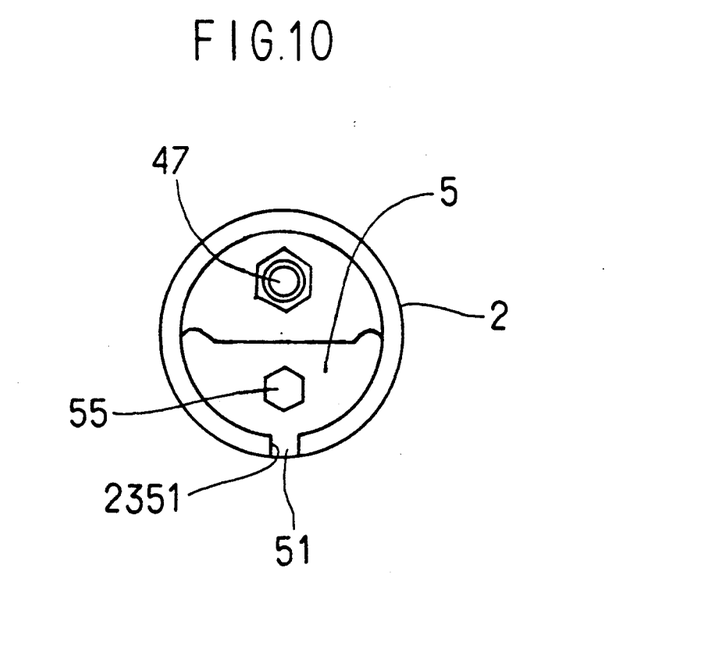
FIG. 10 is a right elevational view of FIG. 9.
Figure 11:
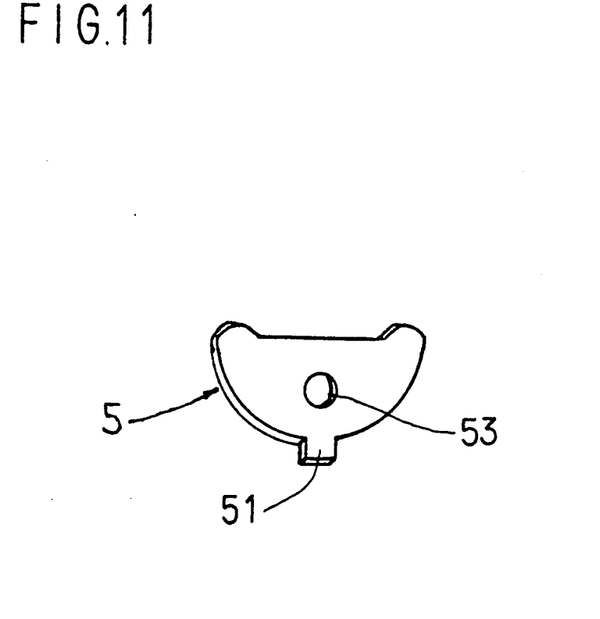
FIG. 11 is a front perspective view of the stop plate of Embodiment 3.

As FIGS. 10 and 11 show, the stop plate 5 has a locking projection 51 which is engaged with a notch 2351 formed in the end surface of the hydraulic cylinder. The cylinder end 4 is provided with fitting 47 for supplying the work oil 80 into the hydraulic cylinder 235. As FIGS. 9 and 12 show, the cylinder end 4 is inserted into the end part 2353 of the hydraulic cylinder 235, and an O-ring 410 for oil sealing is provided therebetween. The O-ring 410 is place within circumferential channel 41 formed in the outer periphery of the cylinder end 4.

The cylinder end 4 also has a step 42 on the outer periphery of its rear surface 401. A stop ring 45 of C-like shape is provided between the step 42 and the inner periphery channel 2356 formed in the hydraulic cylinder 235. The stop ring 45 is held between the step 42 and the hydraulic cylinder 235 with the edge part of the stop plate 5 attached to the rear surface 401 of the cylinder end 4. The cylinder end 4, thus, is held within the hydraulic cylinder 235.

As FIGS. 9 and 12 show, the cylinder end 4 has a hydraulic supply hole 43 into which the fitting 47 extends.

Figure 4:
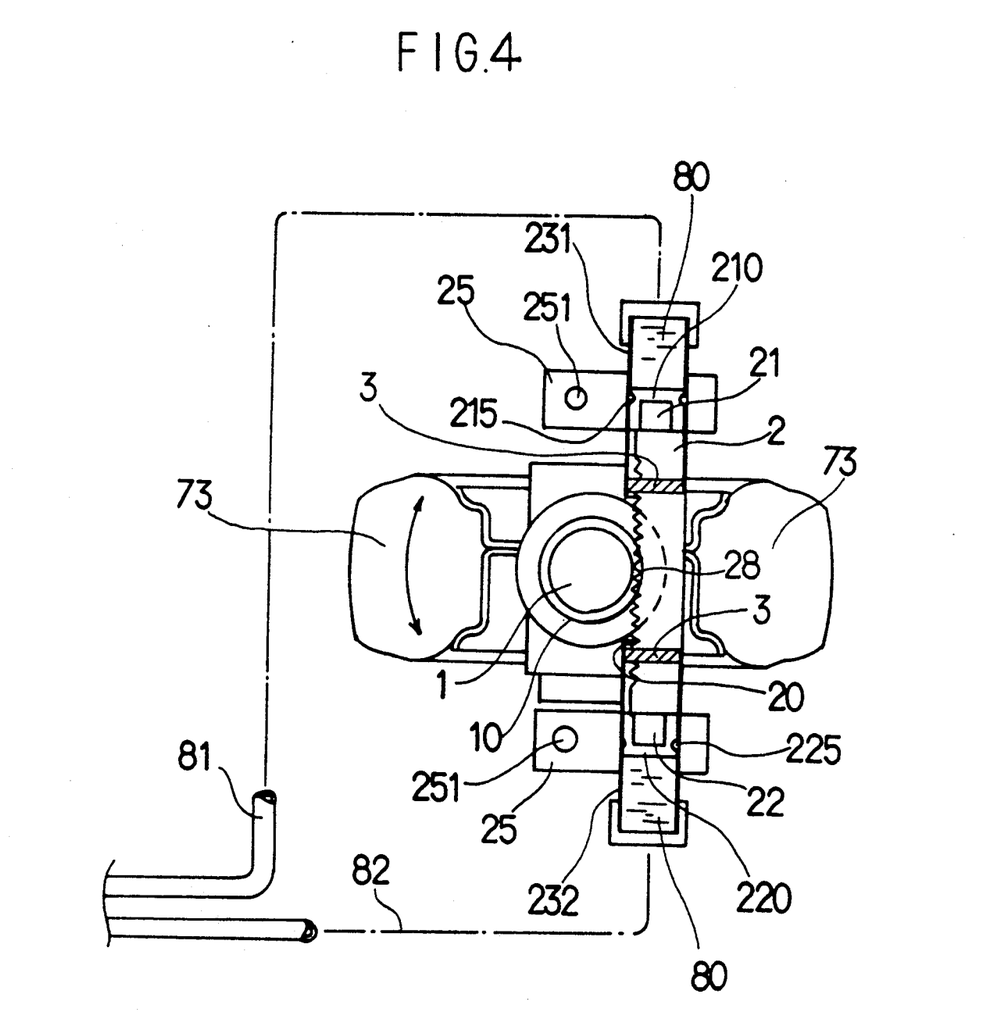
FIG. 4 is a plan view of a steering assembly used in a three-wheel battery fork-lift truck of Embodiment 2.
Figure 5:
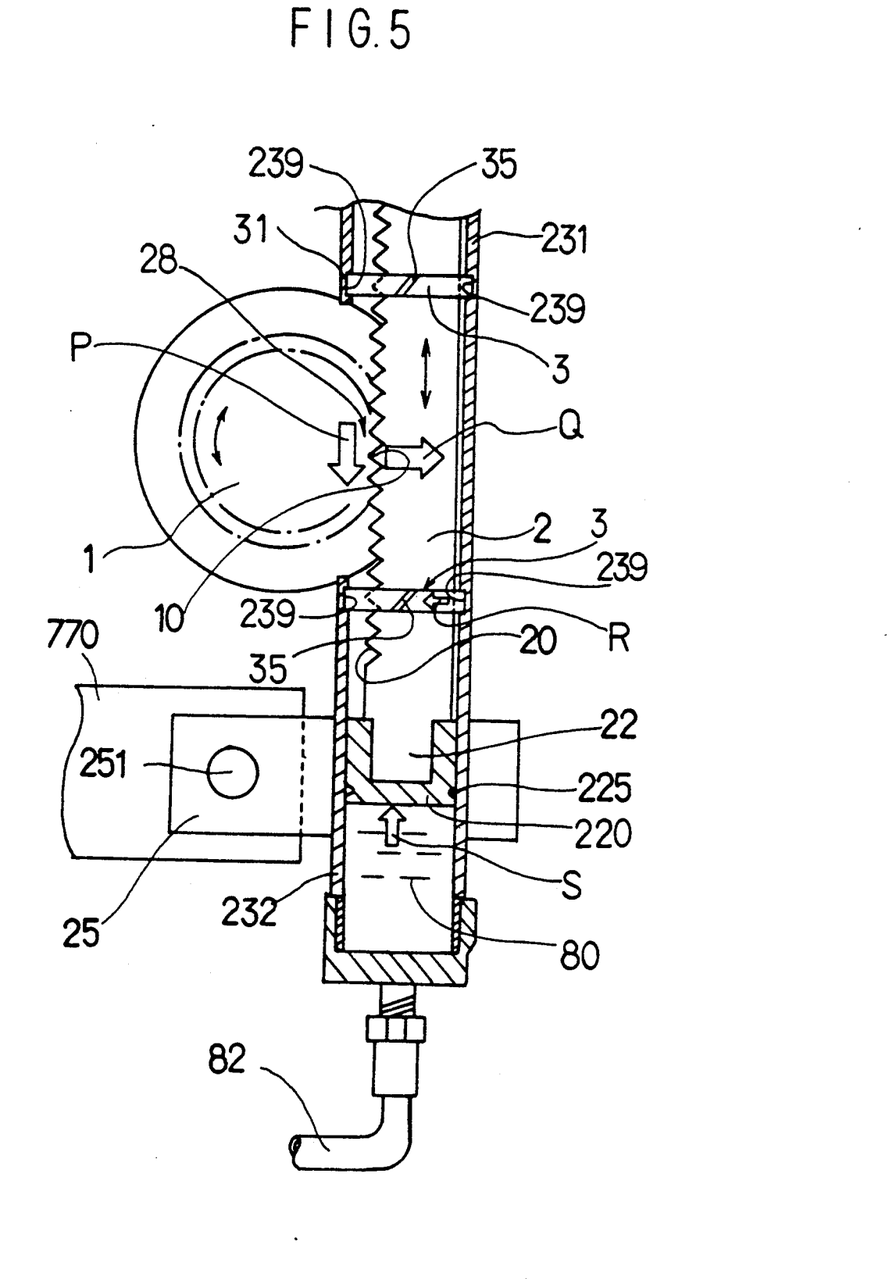
FIG. 5 is a partially enlarged plan view of the steering assembly of Embodiment 2.

As FIGS. 10 and 11 show, the stop plate 5 has, in addition to the projection 51, a bolt hole 53 through which the bolt 55 is inserted. The fittings 47 are perpendicularly placed on the upper part of the cylinder end 4, as shown in FIG. 9. The fittings 47 are connected to the hydraulic hoses 81 and 82, respectively (FIG. 4).

In case the work oil 80 is supplied from the right fitting 47, the piston 210 is pushed to the left. The rack 2, then, is pressed to rotate the pinion for turning the rear steering wheel. At the same time, the work oil in the left side of the hydraulic cylinder is discharged to the hydraulic hose. In case the work oil 80 is supplied from the left fitting 47, the reverse of the above operation is carried out. The function of this embodiment is the same as that of Embodiment 1.

In the present embodiment, the stop plate 5 is secured to the cylinder end 4 with the bolt 55. The projection formed on the stop plate 5 is engaged with the notch 2351 formed in the hydraulic cylinder 235, preventing both stop plate 5 and the cylinder end 4 from rotating at the end of the hydraulic cylinder 235. In case the stop plate 5 has no projection 51, the cylinder end 4 will rotate within the hydraulic cylinder 235 when securing the fittings 47 and bolt 55 to the cylinder end 4. In such case, the fittings 47 cannot be tightly screwed to the cylinder end 4, resulting in a loose fitting.

In the present embodiment, the stop plate 5 is provided with the projection 51 as above, which prevents the cylinder end 4 from rotating, enabling the fittings 47 to be tightly threaded with the cylinder end 4.

The stop ring 45 fitted between the inner periphery channel 2356 of the hydraulic cylinder 235 and the step 42 of the cylinder end 4 is pressed to the outside when the cylinder end 4 is pressed by the piston 210 via the work oil 80. The cylinder end 4 is fixed to the stop plate 5 with the bolt 55. The stop ring 45 is pressed to the inside by the circumferential part of the stop plate 5, so as not to be removed.

When assembling the steering assembly the hydraulic chamber 2350 between the cylinder end 4 and the piston 210 (220) should be filled with oil for the first time. If air resides in the hydraulic chamber 2350, such air works as cushioning to disturb appropriate operations of the rack 2 and the pistons 210 and 220, resulting in fluctuation of the operation of the rear steering wheel.

As FIGS. 9 and 10 show, since the fittings 47 are perpendicularly fitted to the upper part of the cylinder end 4, air residing in the hydraulic chamber 2350 can be completely removed before filling with oil.

Conventionally the fittings 47 are directly fitted to the outer periphery of the hydraulic cylinder 235, by forming such hydraulic cylinder 235 by molding, or by welding the fittings 47 to the hydraulic cylinder 235. The above process requires providing mounting holes in the side wall of the hydraulic cylinder; thus adding to the cost.

In the present invention, the cylinder end 4 is inserted and secured to the end of the hydraulic cylinder 235 for accommodating the fitting 47, resulting in easy processing at low cost.

As described above, the fittings 47 are securely threaded into the cylinder end 4, dislocation of the stop ring 45 is prevented, and air is eliminated from the hydraulic chamber. Additionally the fitting process of the fittings 47 can be easily carried out at low cost.

While the invention has been described with reference to the examples, it is to be understood that modifications or variations may be easily made by a person of ordinary skill in the art without departing from the scope of this invention which is defined by the appended claims.

What is claimed is:

1. A three-wheel battery operated fork-lift truck including two front wheels and one rear steering wheel, the latter being mounted at an end of a substantially vertically mounted steering shaft having its opposite end connected with a steering assembly which comprises:
   a pinion mounted concentrically on said opposite end of said steering shaft for adjusting the angular position of said shaft;
   a rack supported for axial movement in driving tangential engagement with said pinion, and
   an actuator mounted on a truck body frame and coupled to said rack for moving said rack in the axial direction of said rack to rotate said pinion and said steering shaft for steering said truck.

2. A fork-lift truck as in claim 1, wherein said actuator comprises a piston within a hydraulic cylinder and connected to an end of said rack, and a ring-shaped resin bush disposed within said hydraulic cylinder encircling said rack between the inner perimeter of the cylinder and the perimeter of said rack at an intermediate point along said rack between said piston and the point of said engagement between said rack and said pinion for guiding said rack and preventing wear inducing friction between said hydraulic cylinder and said piston.

3. A fork-lift truck as in claim 2, wherein said resin bush is fitted in a ring-shaped concavity formed in an inner periphery of said hydraulic cylinder.

4. A fork-lift truck as in claim 3, wherein said bush has a slot formed in the axial direction.

5. A fork-lift truck as in claim 2, wherein said bush is formed of polyamide resin, polyacetal resin, or silicone resin.

6. A fork-lift truck as in claim 1, wherein said actuator comprises:
   a hydraulic cylinder containing a hydraulically driven piston,
   a cylinder end inserted into an end part of said hydraulic cylinder,
   a stop plate fixed to an exposed surface of said cylinder end,
   a radially outward projection formed on said stop plate;
   a notch formed in an end surface of said hydraulic cylinder engaged by said projection for preventing rotation of said cylinder end relative to said hydraulic cylinder, and
   a threaded fluid conduit fitting for supplying work oil threadedly installed in said cylinder end.

7. A fork-lift truck as in claim 6, wherein an oil seal is provided between said inner perimeter of said hydraulic cylinder and said cylinder end.

8. A fork-lift truck as in claim 6, wherein said stop plate is removably fixed to said cylinder end.

9. A fork-lift truck as in claim 1, wherein said actuator is either a hydraulic cylinder, a pneumatic cylinder, or a power driven stepping motor.

10. A three-wheel battery operated fork-lift truck including two front wheels and one rear steering wheel under the control of a steering shaft connected with a steering assembly which comprises:
    a pinion coupled to said steering shaft;
    a rack supported for axial movement in driving engagement with said pinion; and
    an actuator mounted on a body frame and coupled to said rack for moving said rack in the axial direction, said actuator comprising a hydraulic cylinder containing a hydraulically drivable piston, a cylinder end inserted into an end part of said hydraulic cylinder, a stop plate fixed to an exposed end surface of said cylinder end, a radially outward projection formed on said stop plate, a notch formed in an end surface of said hydraulic cylinder engaged by said projection, a fitting for supplying work oil fitted in said cylinder end, said cylinder end being provided with a step at its periphery adjacent said exposed end surface thereof, and a stop ring disposed between said step and a circumferential channel formed in said hydraulic cylinder to be retained between said step and said circumferential channel.

* * * * *